(12) United States Patent
Kim

(10) Patent No.: US 11,465,694 B2
(45) Date of Patent: Oct. 11, 2022

(54) VEHICLE BODY JOINT STRUCTURE

(71) Applicants: HYUNDAI MOTOR COMPANY, Seoul (KR); KIA CORPORATION, Seoul (KR)

(72) Inventor: Do Hoi Kim, Seoul (KR)

(73) Assignees: HYUNDAI MOTOR COMPANY, Seoul (KR); KIA CORPORATION, Seoul (KR)

( * ) Notice: Subject to any disclaimer, the term of this patent is extended or adjusted under 35 U.S.C. 154(b) by 0 days.

(21) Appl. No.: 17/332,453

(22) Filed: May 27, 2021

(65) Prior Publication Data

US 2022/0126927 A1 Apr. 28, 2022

(30) Foreign Application Priority Data

Oct. 27, 2020 (KR) .................. 10-2020-0140563

(51) Int. Cl.
| | |
|---|---|
| B62D 29/00 | (2006.01) |
| B62D 25/04 | (2006.01) |
| B62D 21/02 | (2006.01) |
| B62D 25/08 | (2006.01) |
| B62D 27/02 | (2006.01) |
| B62D 25/14 | (2006.01) |

(52) U.S. Cl.
CPC ........... B62D 29/005 (2013.01); B62D 21/02 (2013.01); B62D 25/04 (2013.01); B62D 25/081 (2013.01); B62D 25/14 (2013.01); B62D 27/023 (2013.01)

(58) Field of Classification Search
CPC ...... B62D 25/04; B62D 25/081; B62D 25/14; B62D 23/005; B62D 27/023; B62D 29/001; B62D 29/002; B62D 29/004; B62D 29/005
USPC ............................ 296/205, 193.06, 901.01
See application file for complete search history.

(56) References Cited

U.S. PATENT DOCUMENTS 10,351,177 B2 * 7/2019 Steffens ............... B62D 21/157

FOREIGN PATENT DOCUMENTS

| | | | | |
|---|---|---|---|---|
| DE | 102013218743 B4 * | 8/2018 | ............ | B60R 13/02 |
| EP | 1073579 B1 * | 6/2002 | ............ | B62D 25/08 |
| KR | 10-2014-0091510 | 7/2014 | | |
| KR | 10-2015-0063854 | 6/2015 | | |

* cited by examiner

*Primary Examiner* — Dennis H Pedder
(74) *Attorney, Agent, or Firm* — Lempia Summerfield Katz LLC

(57) ABSTRACT

A vehicle body joint structure includes: a frame member made of a metal pipe, extending from a side of a vehicle body to be inclined vertically, and configured to form a front pillar; and a body member made of a plastic composite material, including a dash connection part and a cowl connection part, joined to the frame member, and configured to cover the frame member.

16 Claims, 9 Drawing Sheets

VEHICLE BODY JOINT STRUCTURE

CROSS REFERENCE TO RELATED APPLICATION

The present application claims priority to and the benefit of Korean Patent Application No. 10-2020-0140563, filed on Oct. 27, 2020, the entire contents of which are incorporated herein by reference.

FIELD

The present disclosure relates to a vehicle body joint structure.

BACKGROUND

The statements in this section merely provide background information related to the present disclosure and may not constitute prior art.

Vehicle pillars are classified into a front pillar (pillar A), a center pillar (pillar B), and a rear pillar (pillar C), and they not only support the vehicle roof, but also play important roles of enhancing the vehicle rigidity and safety.

In the case of a conventional monocoque-type vehicle body, multiple components are coupled to each other in complicated structures to form the vehicle body, and respective vehicle models have different component shapes and coupling structures.

As a result, multiple molds are desired to fabricate components for forming the vehicle body of one model, and another group of molds are to be fabricated to form the vehicle body of another model because molds are incompatible.

In addition, if multiple components are used to fabricate a vehicle body according to the assembly structure unique to each model, the workability is degraded.

A new concept of vehicle body structure, referred to as "space frame", has come to be applied for lightweightness and compatibility with other components. However, in the space frame-type vehicle body structure, if the joint portion of each part has week coupling strength and rigidity, the entire body frame becomes fragile.

The above descriptions regarding background arts are only for helping understanding of the background of the present disclosure, and are not to be considered by a person skilled in the art as corresponding to already-known prior arts.

SUMMARY

The present disclosure provides a vehicle body joint structure wherein a component corresponding to the front pillar (A pillar) of a vehicle has excellent strength and rigidity and can be easily assembled with peripheral components in connection with configuring a modularized space frame-type vehicle body structure.

In one form of the present disclosure, a vehicle body joint structure includes: a frame member made of a metal pipe, extending from a side of a vehicle body to be inclined vertically, and configured to form a frame of a front pillar; and a body member made of a plastic composite material, including a dash connection part and a cowl connection part, and configured to be joined to the frame member and cover the frame member.

A corrugated part processed to have a predetermined surface roughness may be provided on a surface of the frame member, thereby increasing a joining force between the frame member and the body member through the corrugated part.

A structural adhesive may be applied to a surface of the frame member, thereby increasing the joining force between the frame member and the body member through the structural adhesive.

The body member may be formed of one of glass fiber reinforced plastics (GFRP), carbon fiber reinforced plastics (CFRP), and plastics.

The vehicle body joint structure may further include: an upper joint cover joined to the body member and configured to cover an upper surface of the body member; an inner joint cover joined to the body member and configured to cover the body member inside the vehicle body; and an outer joint cover facing the inner joint cover, joined to the body member, and configured to cover the body member outside the vehicle body.

Corrugated parts processed to have a predetermined surface roughness may be provided on a bottom surface of the upper joint cover facing the body member, on an inner surface of the inner joint cover, and on an inner surface of the outer joint cover, thereby increasing a joining force between each of the body member and the upper joint cover, the body member and the inner joint cover, and the body member and the outer joint cover through the corrugated parts.

The inner joint cover and the outer joint cover may be connected to each other on a rear surface of the body member and form an opening flange corresponding to an opening in the vehicle body.

The vehicle body joint structure may further include a cowl lower inner cover joined to the upper joint cover to be connected thereto and extending toward a front of the inner joint cover.

The vehicle body joint structure may further include an outer reinforcement cover integrally joined to the upper joint cover and the outer joint cover while covering the upper joint cover and the outer joint cover.

The inner joint cover may include a plurality of holes formed through inner and outer portions thereof, wherein the plurality of holes are configured to receive a plastic resin melted by heat and as the plastic resin is cooled and thus solidified, a joining force between the body member and the inner joint cover may be increased.

The vehicle body joint structure may further include a base member joined to the body member and configured to overlap a bottom surface and an inner side surface of the body member.

An adhesive may be applied to a surface of the base member that comes into contact with the bottom surface and the inner side surface of the body member, thereby increasing a joining force between the body member and the base member through the adhesive.

An assembling protrusion protruding toward a counterpart thereof and an assembling groove matching the assembling protrusion, which are formed on the base member and the body member, respectively, may extend in the lengthwise direction; and the assembling protrusion and the assembling groove may be fitted into and joined to each other, and allow the body member and the base member to be joined to each other.

The vehicle body joint may further include a reinforcing rail fitted into and joined to the assembling groove.

A first fastening groove may be formed on a contact surface of the body member and extend in a lengthwise direction, and the second fastening groove configured to the first fastening groove may be formed on a contact surface of the base member and extend in the lengthwise direction; and a joining bar may be inserted and fitted into the first and the second fastening grooves and allow the body member and the base member to be joined to each other.

A part of a dash assembly forming a space frame vehicle body may be joined to the dash connection part; and a cowl may be joined to the cowl connection part and extend in the widthwise direction of the vehicle body.

The present disclosure is advantageous in that, in connection with configuring a modularized space frame-type vehicle body structure, a frame member made of a metal pipe, which corresponds to the front pillar (A pillar) of a vehicle, a body member made of a plastic composite material, and a base member are connected while guaranteeing assembly convenience and securing excellent strength and rigidity, thereby guaranteeing improved coupling characteristics, strength, rigidity, and durability.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which.

Figure 4:
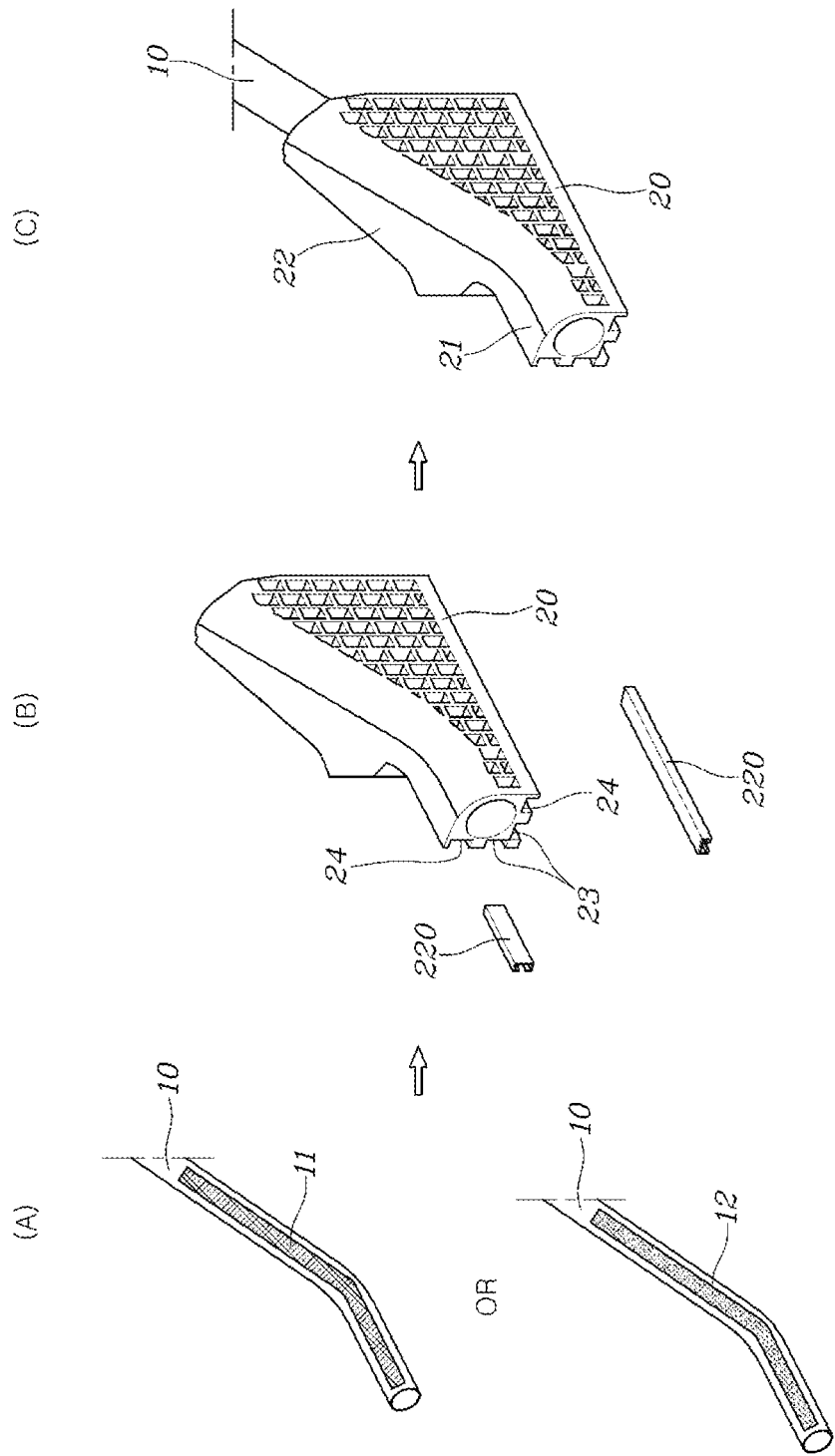
Figure 5:
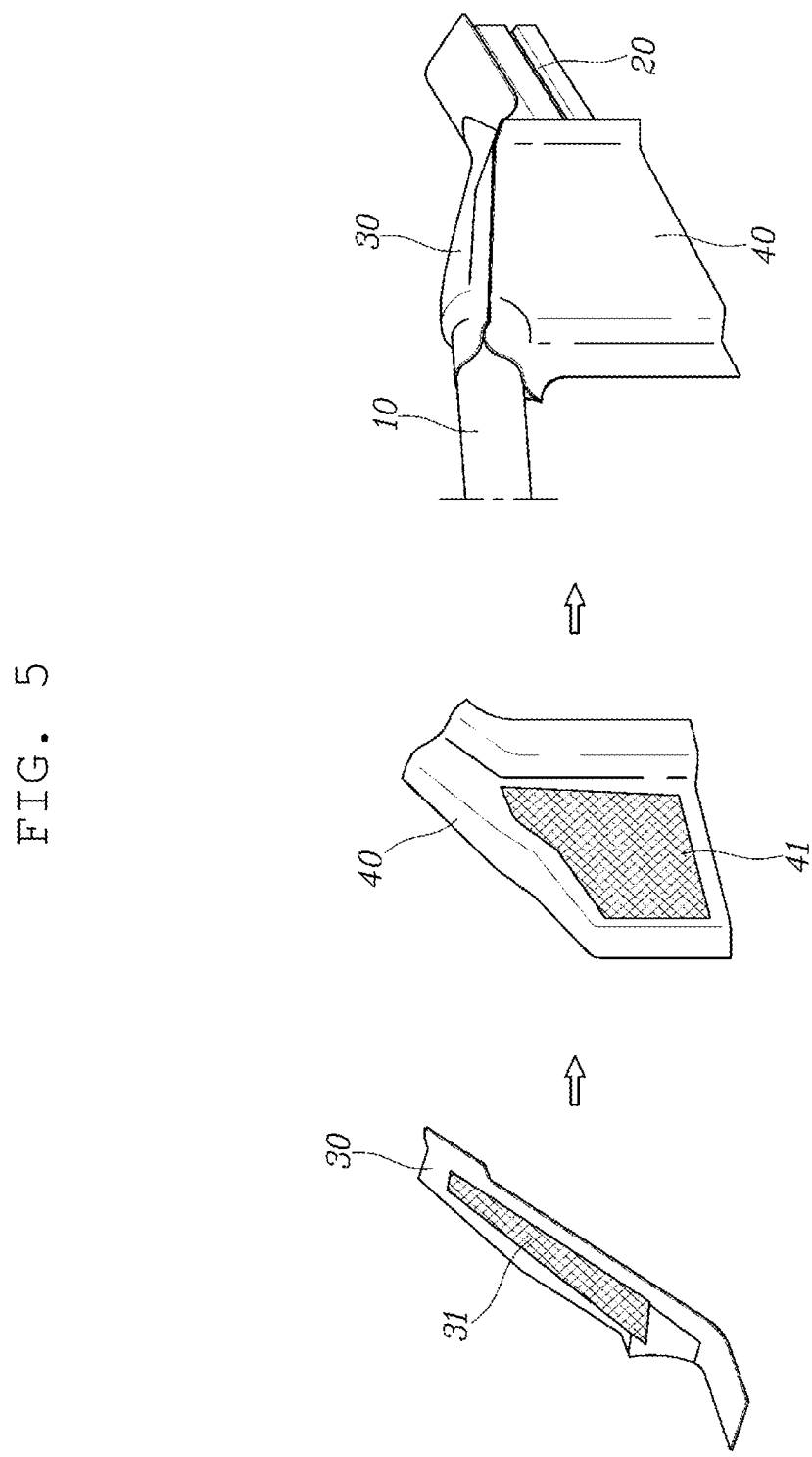
Figure 6:
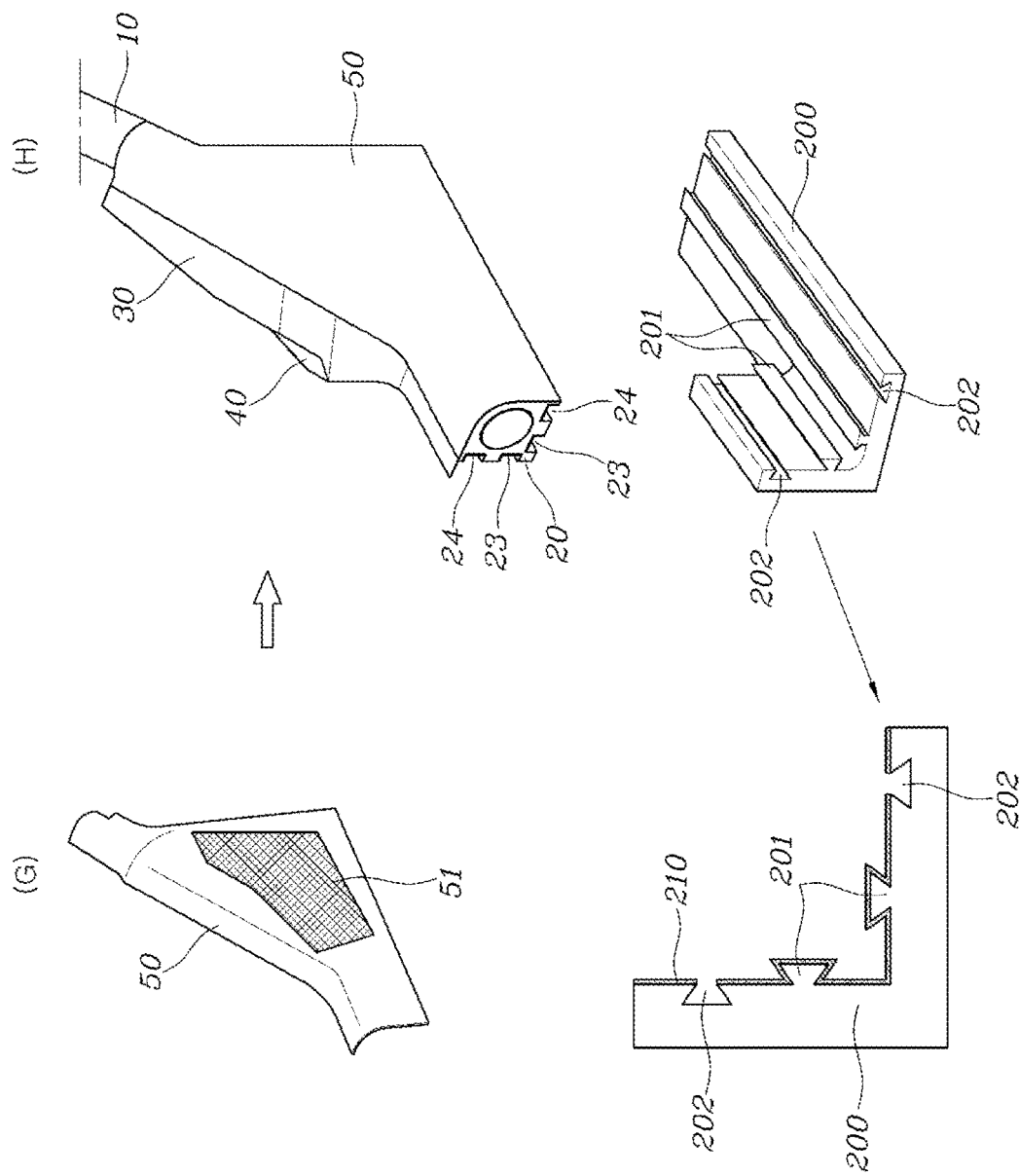
Figure 7:
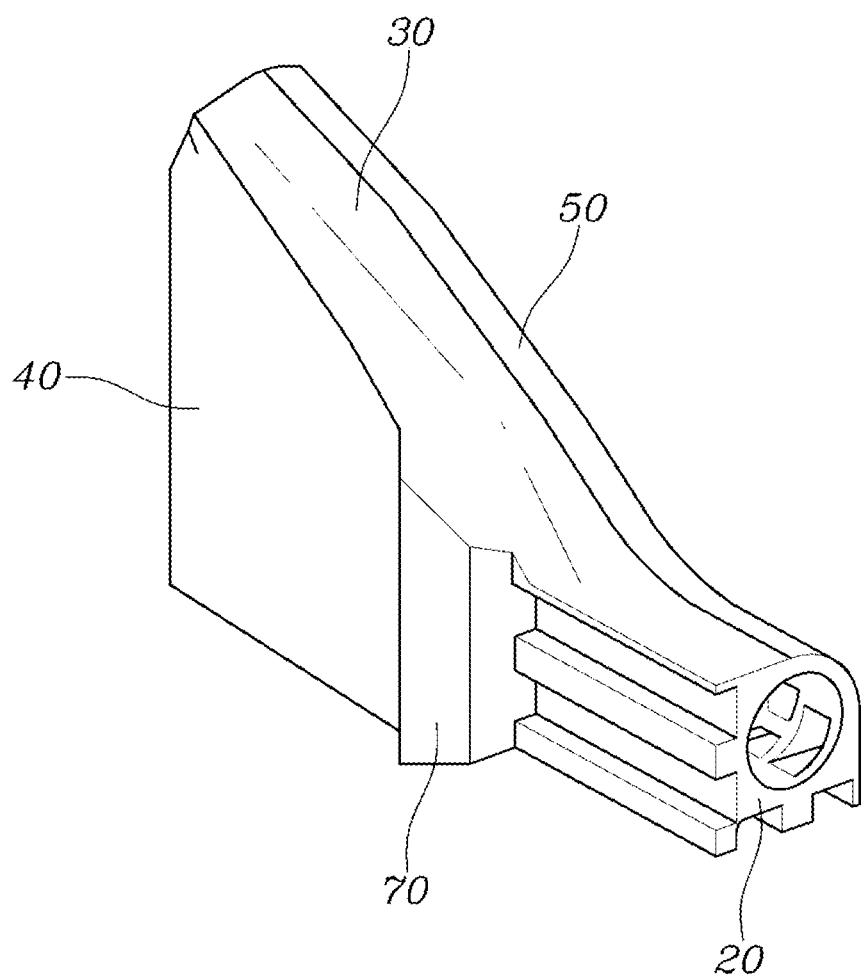
Figure 8:
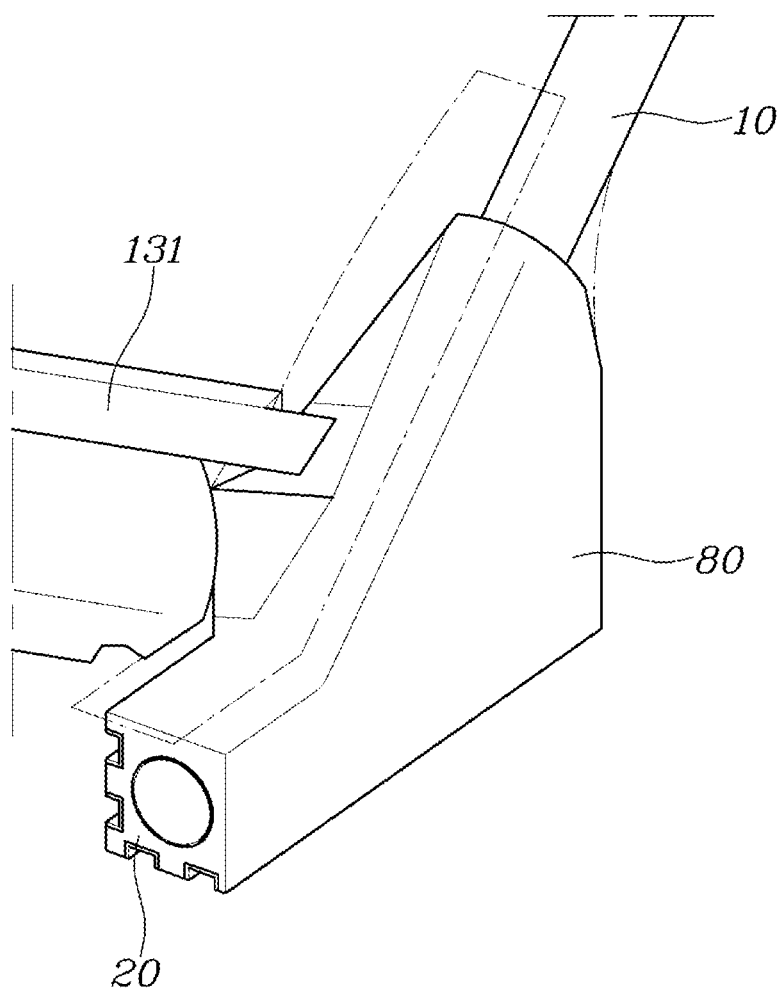
Figure 9:
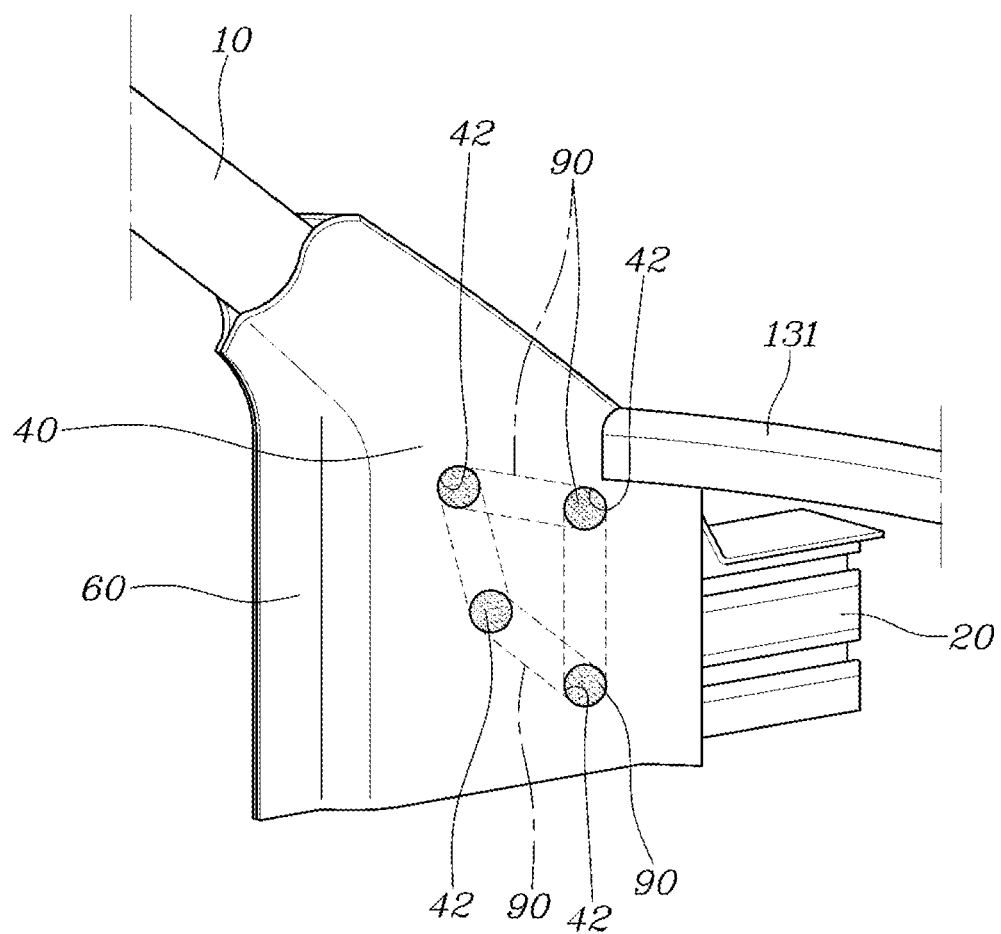

FIGS. 4 to 6 explain processes of manufacturing the front pillar according to one form of the present disclosure;

FIGS. 7 to 8 explain a cowl lower inner cover and an outer reinforcement cover according to one fora of the present disclosure; and FIG. 9 explains a structure in which a body member and an inner joint cover are coupled to each other by a plastic resin solidified by cooling, according to one form of the present disclosure.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

Various changes and modifications may be made to various forms according to the present disclosure, and therefore particular embodiments will be illustrated in the drawings and described in the specification or application. However, it should be understood that various forms according to the concept of the present disclosure are not limited to the particular disclosed forms, but the present disclosure includes all modifications, equivalents, and alternatives falling within the spirit and scope of the present disclosure.

Such terms as "a first" and/or "a second" may be used to described various elements, but the elements should not be limited by these terms. These terms are intended merely to distinguish one element from other elements. For example, a first element may be named a second element and similarly a second element may be named a second element without departing from the scope of protection of the present disclosure.

In the case where an element is referred to as being "connected" or "accessed" to other elements, it should be understood that not only the element is directly connected or accessed to the other elements, but also another element may exist between them. Contrarily, in the case where a component is referred to as being "directly connected" or "directly accessed" to any other component, it should be understood that there is no component therebetween. The other expressions of describing a relation between structural elements, i.e. "between" and "merely between" or "neighboring" and "directly neighboring", should be interpreted similarly to the above description.

The terms used herein are merely used to describe specific embodiments, and are not intended to limit the present disclosure. A singular expression may include a plural expression unless they are definitely different in a context. As used herein, the expression "include" or "have" are intended to specify the existence of mentioned features, numbers, steps, operations, elements, components, or combinations thereof, and should be construed as not precluding the possible existence or addition of one or more other features, numbers, steps, operations, elements, components, or combinations thereof.

Unless defined otherwise, all terms used herein, including technical and scientific terms, have the same meaning as those commonly understood by a person skilled in the art to which the present disclosure pertains. Such terms as those defined in a generally used dictionary may be interpreted to have the meanings equal to the contextual meanings in the relevant field of art, and are not to be interpreted to have ideal or excessively formal meanings unless clearly defined herein.

Hereinafter, a vehicle body joint structure according to one form of the present disclosure will be described with reference to the accompanying drawings.

Figure 1:
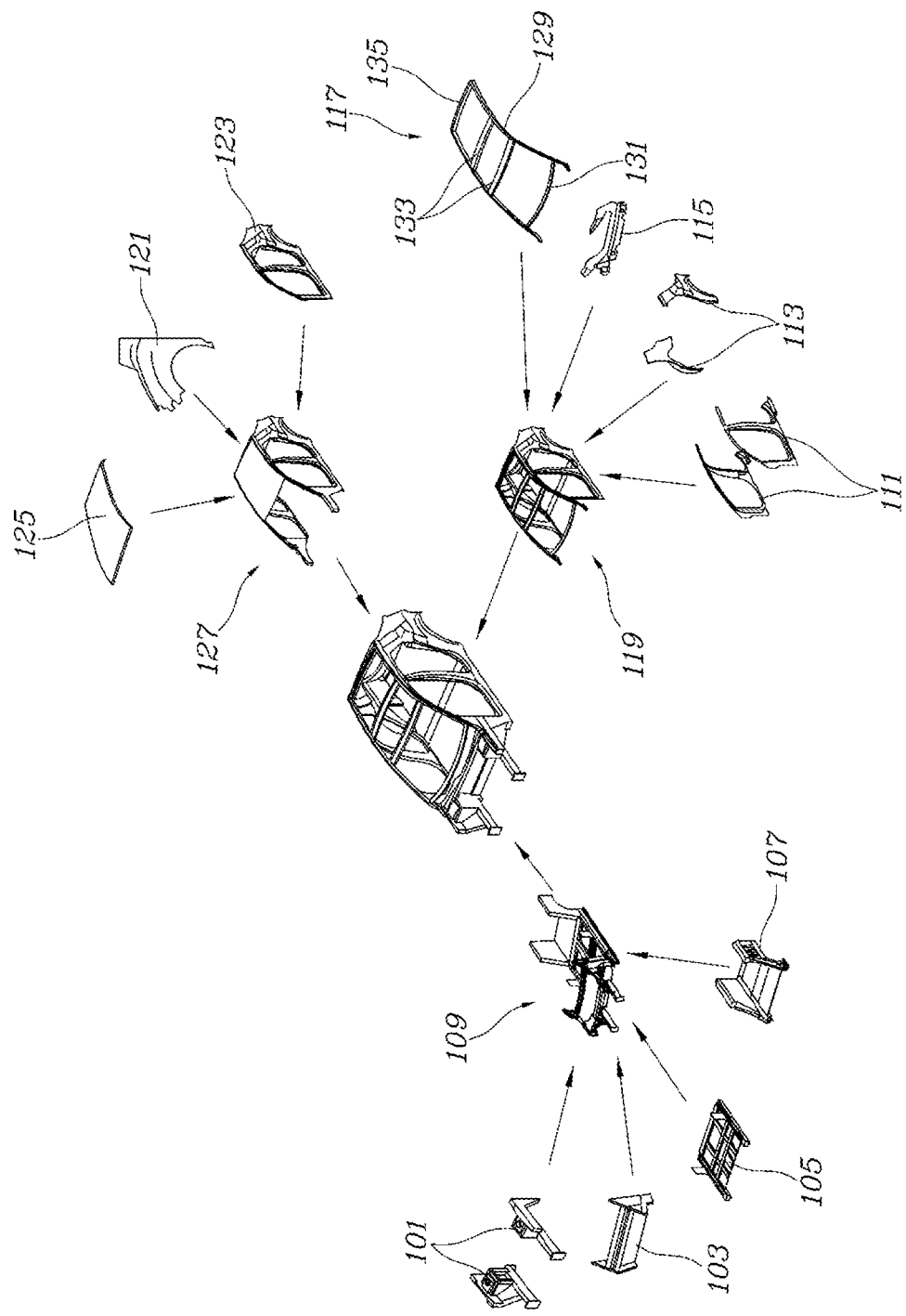
FIG. 1 illustrates a modularized space frame vehicle body to which one form of the present disclosure is applicable.
Figure 2:
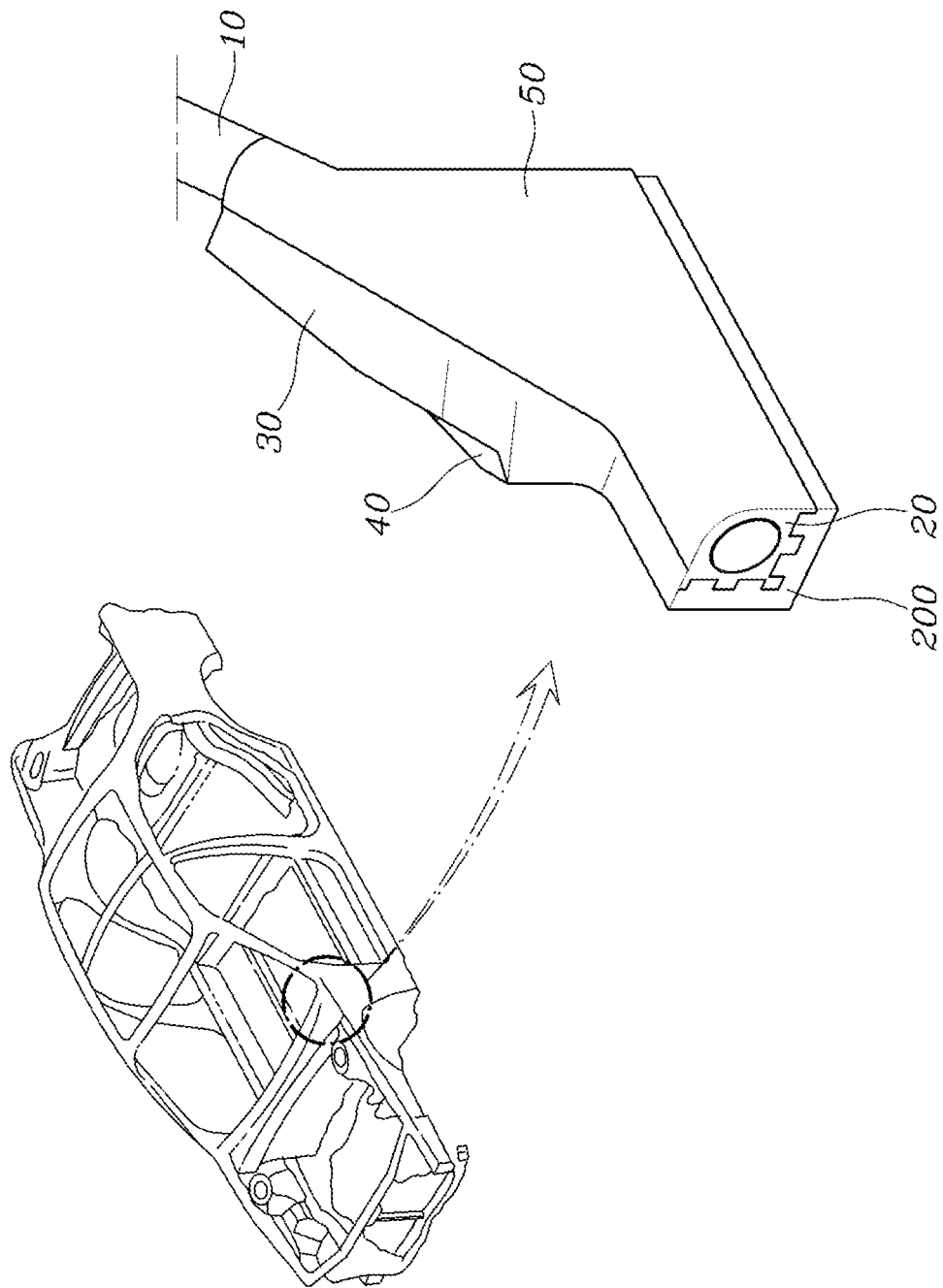
FIG. 2 illustrates a front pillar as a vehicle body joint structure according to one form of the present disclosure.
Figure 3:
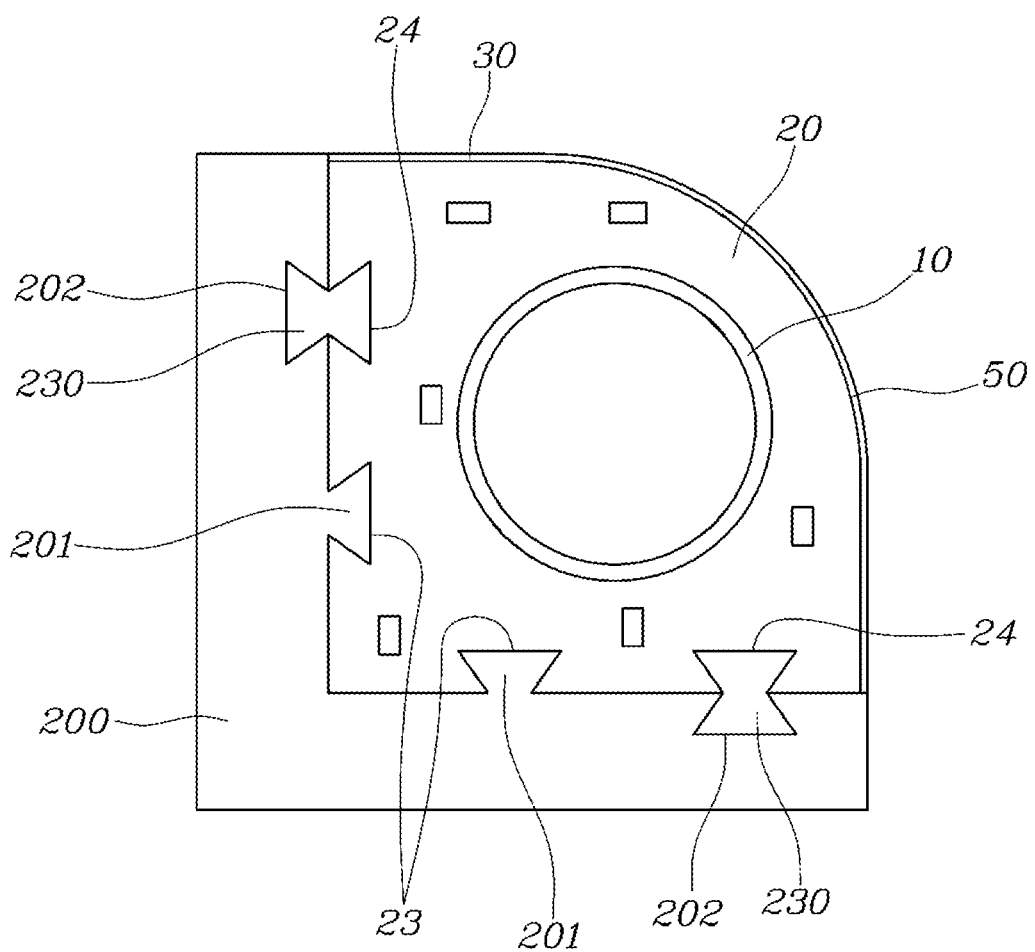
FIG. 3 illustrates the front pillar of FIG. 2 viewed from the front.

FIG. 1 illustrates a modularized space frame vehicle body to which the present disclosure is applicable, and conceptually illustrates that it is possible to form a space frame vehicle body by joining a skin assembly 127 to a floor assembly 109 and an upper assembly 119, which are first assembled with each other. The floor assembly 109 includes front apron assemblies 101, a dash assembly 103, a center floor assembly 105, and a rear floor assembly 107, the upper assembly 119 includes side assemblies 111, quarter assemblies 113, a back assembly 115, and a roof carrier 117, and the skin assembly 127 includes a fender 121, a side outer 123, and a roof panel 125.

For reference, the above description or the expression shown in FIG. 1 is only for explaining the structure of the space frame vehicle body mentioned in the present disclosure in an easy-to-understand manner, and does not refer to an assembly sequence of parts forming a real space frame vehicle body. Thus, the actual assembly sequence may vary according to various circumstances.

The roof carrier 117 includes: roof side tubes 129, which are disposed on both sides of a vehicle body; and a cowl 131, middle roof rails 133, and a rear roof rail 135, which connect the roof side tubes 129 to each other while being disposed therebetween. Each of the roof side tubes 129, the cowl 131, the middle roof rails 133, and the rear roof rail 135 has a hollow closed cross-sectional structure so as to form a space frame structure. The roof carrier 117 can be easily applied to various vehicle types or models by being changed in a manner of elongating or shortening the roof side tubes 129 in the lengthwise direction of the vehicle body and elongating or shortening the cowl 131, the middle roof rails 133, and the rear roof rail 135 in the widthwise direction of the vehicle body.

The front apron assemblies 101, the dash assembly 103, the center floor assembly 105, and the rear floor assembly 107, which are modularized to form the floor assembly 109, are assembled by modifying the lengths or the widths thereof, whereby the floor assembly 109 can be easily changed to be applied to various vehicle types or models.

Of course, according to the change in the roof carrier 117 and the floor assembly 109, other parts can also be assembled thereto by adjusting the shapes or sizes thereof, to enable: easy development of a vehicle body suitable for a vehicle type or model to be newly developed, thus allowing easier development of new vehicle models; and effective application to a production method involving multiple types and small quantities.

Meanwhile, the skin assembly 127 configured by the fender 121, the side outer 123, and the roof panel 125 may be applied to the space frame as described above by freely modifying shapes thereof according to a desired vehicle type or model by using various materials, such as carbon fiber reinforced plastics (CFRP) as well as a conventional general steel plate, thereby enabling easy production of a variety of vehicles.

The vehicle body joint structure of the present disclosure, which may be applied to the space frame vehicle body having the above-described configuration, includes, as shown in FIGS. 2 to 9: a frame member 10 made of a metal pipe and extending from a side of a vehicle body to be inclined vertically so as to form a frame of a front pillar (pillar A); and a body member 20 which is made of a plastic composite material, includes a dash connection part 21 and a cowl connection part, and is joined to the frame member 10 so as to cover the frame member 10.

The frame member 10 may be formed of a hollow tube or pipe which is empty inside, and the body member 20 may have a honeycomb-like structure in which a plurality of holes are formed, thereby forming a space frame structure.

The frame member 10 and the body member 20 may be manufactured by molding the same in a process that combines hydroforming and injection molding. Alternatively, a frame member 10 molded through bending and a body member 20 molded through injection molding may be coupled to each other in a two-stage process.

The body member 20 may be formed of one of glass fiber reinforced plastics (GFRP), carbon fiber reinforced plastics (CFRP), and plastics that reduce the weight and provide the desired strength and stiffness.

The body member 20 made of a plastic composite material may be variously manufactured by deforming the shape thereof according to a vehicle type or model, thereby facilitating the production of various vehicles with increased design freedom.

A corrugated part 11 processed to have a predetermined surface roughness may be provided on the surface of the frame member 10, as shown in FIG. 4(A). The corrugated part 11 can increase the joining force between the frame member 10 and the body member 20, thereby providing excellent strength and stiffness.

The corrugated part 11 may be formed by roughening the surface of the frame member 10 using a laser or plasma, and the joining force between the frame member 10 and the body member 20 can be enhanced by increasing the frictional force through the corrugated part 11.

As another example, a structural adhesive 12 such as a bond may be applied to the surface of the frame member 10 to increase the joining force between the frame member 10 and the body member 20 using the structural adhesive 12, thereby providing excellent strength and stiffness.

As shown in FIGS. 5 to 6, the present disclosure further includes: an upper joint cover 30 joined to the body member 20 while covering an upper surface of the body member 20; an inner joint cover 40 joined to the body member 20 while covering the body member 20 inside the vehicle body; and an outer joint cover 50 facing the inner joint cover 40 and joined to the body member 20 while covering the body member 20 outside the vehicle body.

The upper joint cover 30, the inner joint cover 40, and the outer joint cover 50 cover and protect the body member 20, and also improve the strength and stiffness of the body member 20.

Corrugated parts 31, 41, and 51 processed to have a predetermined surface roughness are provided on the bottom surface of the upper joint cover 30 facing the body member 20, the inner surface of the inner joint cover 40, and the inner surface of the outer joint cover 50, respectively. The corrugated parts 31, 41, and 51 can increase the joining force between each of the body member 20 and the upper joint cover 30, the body member 20 and the inner joint cover 40, and the body member 20 and the outer joint cover 50, thereby providing excellent strength and stiffness.

The inner joint cover 40 and the outer joint cover 50 may be connected to each other on the rear surface of the body member 20 to form an opening flange 60 corresponding to an opening in the vehicle body.

The side where the opening flange 60 is installed corresponds to the part where a door of a vehicle is installed. The opening flange 60 may be formed on either or both of the inner joint cover 40 and the outer joint cover 50. The opening flanges 60 are bonded to each other to install a rubber seal such as a weather strip therebetween, and thus can be used for relieving noise and vibration of a vehicle and providing the watertightness thereof.

As shown in FIG. 7, the present disclosure may further include a cowl lower inner cover 70 joined to the upper joint cover 30 to be connected thereto while extending toward the front of the inner joint cover 40. The cowl lower inner cover 70 may be joined to the upper joint cover 30 and the inner joint cover 40 at the inner front side of the vehicle body to be connected thereto, thereby increasing the joining force therebetween.

In addition, as shown in FIG. 8, the present disclosure may further include an outer reinforcement cover 80 integrally joined to the upper joint cover 30 and the outer joint cover 50 while covering the upper joint cover 30 and the outer joint cover 50. The outer reinforcement cover 80 can cover and protect the upper joint cover 30 and the outer joint cover 50, thereby improving the strength and stiffness of the body member 20.

As shown in FIG. 9, the inner joint cover 40 according to the present disclosure may include a plurality of holes 42 formed through the inner and the outer portion thereof. A plastic resin 90, melted by heating, may be inserted into the inner joint cover 40 through the holes 42. As the plastic resin 90 is cooled and thus solidified, the joining force between the body member 20 and the inner joint cover 40 can be increased, thereby improving the strength and stiffness thereof.

The body member 20 and the inner joint cover 40 may be joined to each other through injection-molding without welding, thereby facilitating assembly thereof and reducing costs.

In addition, the present disclosure further includes a base member 200 joined to the body member 20 such that the base member 200 overlaps the bottom surface and the inner side surface of the body member 20.

The base member 200 may correspond to a part of the front apron assembly 101 in a vehicle body structure having a space frame.

As shown in FIG. 6, an adhesive 210 may be applied to the surface of the base member 200 that comes into contact with the bottom surface and the inner side surface of the body member 20. The joining force between the body member 20 and the base member 200 can be further increased by the adhesive 210, thereby improving the strength and stiffness of the vehicle body joint.

An assembling protrusion 201 protruding toward a counterpart thereof and an assembling groove 23 matching the assembling protrusion 201, which are formed on the base member 200 and the body member 20, respectively, may extend in the lengthwise direction, and the assembling protrusion 201 and the assembling groove 23 may be fitted into and joined to each other to enable the body member 20 and the base member 200 to be joined to each other.

The body member 20 and the base member 200 may be joined to each other by fitting-assembly of the groove and the protrusion without welding, thereby facilitating assembly thereof and reducing costs.

In one form of the present disclosure, a structure in which the assembling protrusion 201 is formed on the base member 200 and the assembling groove 23 is formed on the body member 20 is presented as an example. However, according to need, the groove and the protrusion may be formed on the base member 200 and on the body member 20, respectively.

As shown in FIG. 4(B), the present disclosure may further include a reinforcing rail 220 fitted into and joined to the assembling groove 23 of the body member 20, thereby further enhancing the strength and stiffness of the body member 20 through the reinforcing rail 220.

In addition, a first fastening groove 24 and a second fastening groove 202 matching each other may be formed on contact surfaces of the body member 20 and the base member 200 and may extend in the lengthwise direction, and a joining bar 230 may be fitted into and joined to the first and second fastening grooves 24, 202. The body member 20 and the base member 200 are joined to each other through the joining bar 230, thereby further increasing the joining force thereof.

Meanwhile, a part of the dash assembly 103 forming a space frame vehicle body may be joined to the dash connection part 21 provided on the body member 20, the cowl 131 may be joined to the cowl connection part 22 to extend in the widthwise direction of the vehicle body, and the cowl 131 may become a cowl upper member.

According to need, the cowl 131 may be joined to the cowl connection part 22 by moving the cowl 131 up and down, thereby increasing freedom in the design of the space frame vehicle body structure.

As described above, one form of the present disclosure relates to a structure in which, in connection with configuring a vehicle body structure with a modularized space frame method, a frame member 10 made of a metal pipe, a body member 20 made of a plastic composite material, and a base member 200, which correspond to a front pillar (pillar A) of a vehicle body, are easily assembled with and connected to each other while providing excellent strength and stiffness, thereby improving durability while providing strength and stiffness with a stronger joining force.

Although the present disclosure has been described and illustrated in conjunction with particular forms thereof, it will be apparent to those skilled in the art that various improvements and modifications may be made to the present disclosure without departing from the technical idea of the present disclosure.

What is claimed is:

1. A vehicle body joint structure comprising:
   a frame member made of a metal pipe, extending from a side of a vehicle body to be inclined vertically, and configured to form a front pillar; and
   a body member made of a plastic composite material, including a dash connection part and a cowl connection part, joined to the frame member, and configured to cover the frame member.

2. The vehicle body joint structure of claim 1, further comprising a corrugated part processed to having a predetermined surface roughness and provided on a surface of the frame member.

3. The vehicle body joint structure of claim 1, further comprising a structural adhesive applied to a surface of the frame member.

4. The vehicle body joint structure of claim 1, wherein the body member is formed of at least one of glass fiber reinforced plastics (GFRP), carbon fiber reinforced plastics (CFRP), or plastics.

5. The vehicle body joint structure of claim 1, further comprising:
   an upper joint cover joined to the body member and configured to cover an upper surface of the body member;
   an inner joint cover joined to the body member and configured to cover the body member inside the vehicle body; and
   an outer joint cover facing the inner joint cover, joined to the body member, and configured to cover the body member outside the vehicle body.

6. The vehicle body joint structure of claim 5, further comprising:
   corrugated parts processed to have a predetermined surface roughness, and provided on a bottom surface of the upper joint cover facing the body member, on an inner surface of the inner joint cover, and on an inner surface of the outer joint cover.

7. The vehicle body joint structure of claim 5, wherein the inner joint cover and the outer joint cover are connected to each other on a rear surface of the body member and form an opening flange corresponding to an opening in the vehicle body.

8. The vehicle body joint structure of claim 5, further comprising a cowl lower inner cover joined to the upper joint cover and extending toward a front of the inner joint cover.

9. The vehicle body joint structure of claim 5, further comprising an outer reinforcement cover integrally joined to the upper joint cover and the outer joint cover and configured to cover the upper joint cover and the outer joint cover.

10. The vehicle body joint structure of claim 5, wherein the inner joint cover includes a plurality of holes formed through inner and outer portions thereof, and
   the plurality of holes is configured to receive a plastic resin melted by heat, wherein when the plastic resin is cooled and solidified, a joining force between the body member and the inner joint cover is increased.

11. The vehicle body joint structure of claim 1, further comprising a base member joined to the body member and configured to overlap a bottom surface and an inner side surface of the body member.

12. The vehicle body joint structure of claim 11, further comprising an adhesive applied to a surface of the base member that comes into contact with the bottom surface and the inner side surface of the body member.

13. The vehicle body joint structure of claim 11, further comprising:
 an assembling protrusion protruding toward a counterpart and formed on the base member; and
 an assembling groove matching the assembling protrusion and formed on the body member; and
 wherein the assembling protrusion and the assembling groove extend in a lengthwise direction, are fitted into and joined to each other, and are configured to allow the body member and the base member to be joined to each other.

14. The vehicle body joint structure of claim 13, further comprising a reinforcing rail fitted into and joined to the assembling groove.

15. The vehicle body joint structure of claim 11, further comprising:
 a first fastening groove formed on a contact surface of the body member and extending in a lengthwise direction;
 a second fastening groove formed on a contact surface of the base member, configured to match with the first fastening groove, and extending in the lengthwise direction; and
 a joining bar inserted and fitted into the first and the second fastening grooves, and configured to allow the body member and the base member to be joined to each other.

16. The vehicle body joint structure of claim 1, further comprising:
 a dash assembly forming a space frame vehicle body and joined to the dash connection part; and
 a cowl joined to the cowl connection part and extending in a widthwise direction of the vehicle body.

* * * * *